Dec. 1, 1942.   J. W. ASPENLEITER   2,303,900
STRAP CONNECTOR
Filed Sept. 29, 1941
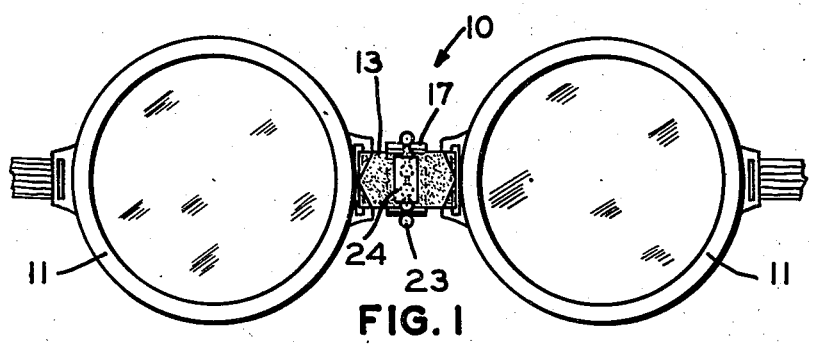
FIG. 1
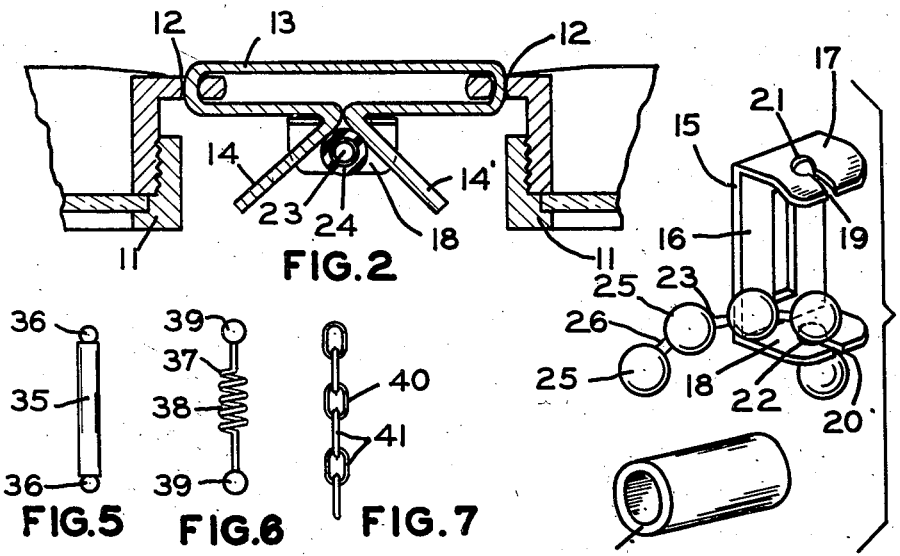
FIG. 2   FIG. 3
FIG. 5   FIG. 6   FIG. 7
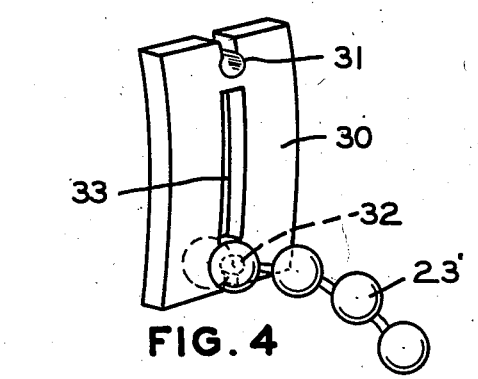
FIG. 4
JOSEPH W. ASPENLEITER
INVENTOR
BY
ATTORNEY Patented Dec. 1, 1942

2,303,900

UNITED STATES PATENT OFFICE 2,303,900

STRAP CONNECTOR

Joseph W. Aspenleiter, Rochester, N. Y., assignor to Bausch & Lomb Optical Company, Rochester, N. Y., a corporation of New York Application September 29, 1941, Serial No. 412,714

3 Claims. (Cl. 24—168)

This invention relates to devices for connecting the end portions of a flexible strap such as used as a bridge for connecting the eyecups of a goggle, for example.

One of the objects of my invention is to provide an improved connector for the end portions of a flexible strap which will be relatively simple in structure yet efficient in operation. Another object is to provide a connector of the type described which will have a minimum number of parts so that manufacturing operations are greatly reduced. A further object is to provide a strap connector that can be adjusted and operated without the use of tools. These and other objects and advantages reside in certain novel features of construction, arrangement and combination of parts as will hereinafter be more fully described and pointed out in the appended claims.

Referring to the drawing:

Fig. 1 shows a front view of a goggle employing my new connector on the strap bridge.

Fig. 2 is an enlarged fragmentary horizontal section taken through the bridge and connector.

Fig. 3 is a perspective view showing the parts of the connector partly assembled.

Fig. 4 is a modified form of connector.

Figs. 5, 6 and 7 show modified forms of clamping elements.

A preferred embodiment of my invention, indicated generally at 10, is shown in the drawing as applied to one well known type of goggle having the two eyecups 11, the nasal sides of which are provided with slots 12 through which extends the flexible bridge strap 13 having the end portions 14 and 14'. As shown in Fig. 3, the strap connector is made of a U-shaped member 15 having the base 16 and the spaced upstanding end portions 17 and 18 integral therewith. The end portions 17 and 18 are provided, respectively, with notches 19 and 20 which extend inwardly from the edges to the enlarged holes 21 and 22. A clamping element, such as a piece of the bead chain 23, connects the two end portions 17 and 18 and extends between the end portions 14 and 14' of the strap 13 to clamp the portions of the strap against the base 16 to hold the parts in adjusted position. A piece of rubber tubing 24, or the like, may be used to cover the chain to afford better frictional engagement of the parts.

As will be apparent from the drawing, the bead chain 23 is of a well known construction in which a series of spaced beads or spherical shells 25 are loosely connected by narrow links 26 so that the chain may be regarded as being flexible whereby parts of it may be moved relatively to other parts. One end of chain 23 is attached to the end portion 18 by passing the link through the narrow notch 20 so that the adjacent beads 25 retain the chain. The notch 20 should be so constructed that the sides thereof yield slightly when the link is forced thereinto. The upstanding end portion 17 has its upper edge slightly bent inward as shown in Fig. 3 so that the other end of chain 23 may be forced into notch 19 and down into the hole 21 against the tension of the parts and thereby hold the chain 23 in position to engage the parts of the strap 13.

A modification is shown in Fig. 4 wherein 30 indicates a plate member which is preferably slightly curved and formed of relatively resilient material. One edge of the plate 30 carries the notch 31 while the opposite edge is notched as at 32 to receive the respective ends of bead chain 23'. The plate 30 is provided with the longitudinal slot 33 to receive the end portions of the bridge strap in the same manner as in the device of Figs. 1-3. The bead chain 23' will therefore serve to clamp the strap portions against the base 30 with the tension of the plate acting to releasably hold the chain. A rubber tube or the like may, of course, be used to encase chain 23' so as to afford greater frictional engagement of the parts, as in the construction shown in Figs. 1-3.

In Figs. 5-7, I have shown further modifications of the clamping element. The clamping element 35 of Fig. 5 takes the form of a rigid member having integral ball-shaped portions 36 at its respective ends adapted to fit into the respective notches 19 and 20 of the member 16 in place of chain 23. The clamping element 37 of Fig. 6 comprises a coiled spring 38 having the ball shaped portions 39 at its respective ends for engaging the notches 19 and 20 instead of the chain 23. In Fig. 7 I have shown a clamping element 40 which comprises a piece of chain having the interconnected links 41 for engagement with the notches of the member 16 instead of the bead chain 23.

From the foregoing, it will be apparent that I am able to attain the objects of my invention and provide a relatively simple yet efficient connector for the end portions of a flexible strap. The various forms of my invention can be readily and cheaply manufactured and they can be easily and quickly assembled or adjusted without the use of tools. Various modifications can obviously be made without departing from the spirit of my invention.

I claim:

1. A device for connecting the ends of a flexible strap comprising a member having notch means formed in opposite edges thereof, said member having a longitudinal slot lying between the notch means and substantially in alignment therewith, and a clamping element, each end of the clamping element having an enlargement and an adjacent reduced portion engaging in the notch means, at least one end of the element being releasably secured in the notch means, the end portions of the strap being adapted to extend through said longitudinal slot and to be positioned, respectively, on the sides of the clamping element.

2. A device for connecting the ends of a flexible strap comprising a member having a base portion and two upstanding end portions, said base portion having a longitudinal slot, and a flexible clamping element having spaced enlargements separated by reduced neck portions, one end of the element being secured to one of said end portions, the other end portion being yieldable and provided with a notch to receive a neck portion of the element whereby the element is releasably held, the end portions of the strap being adapted to extend through said longiudinal slot on the respective sides of the clamping element.

3. The combination of a flexible strap and means for connecting the ends of the strap comprising a member having a base portion and two spaced upstanding end portions, said member having a longitudinal slot lying between the end portions, and a flexible clamping element having spaced enlargements, each of said end portions having notch means in which the respective ends of the element are engaged, at least one end of the element being releasably engaged, the ends of the strap extending through said slot and the clamping element being positioned between and in clamping engagement with the ends of the strap.

JOSEPH W. ASPENLEITER.